KING & OGDEN.
Grain Drill.
No. 106,594.                 Patented Aug. 23, 1870.
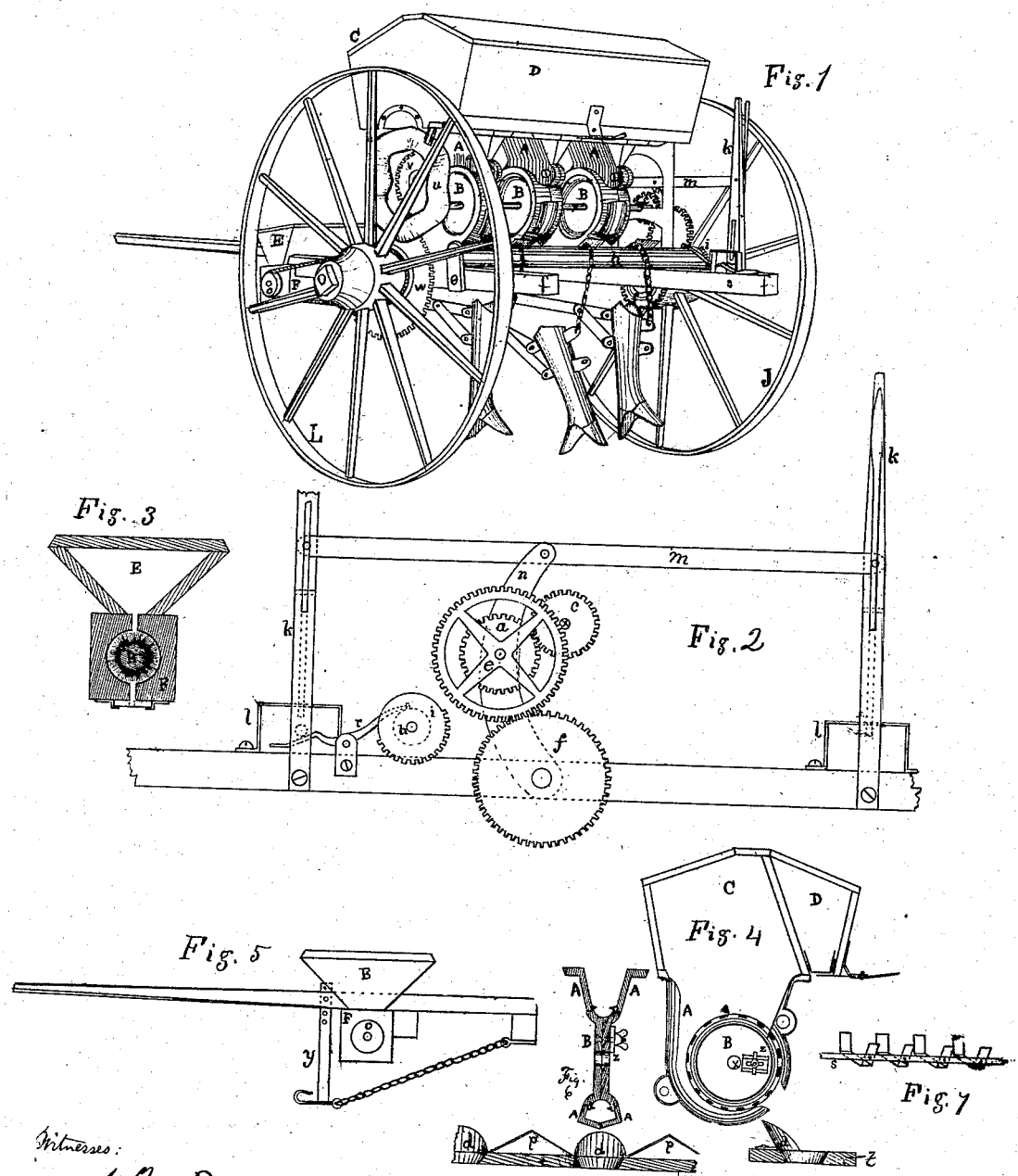

United States Patent Office.

SETH L. KING AND WILLIAM OGDEN, OF OWEGO, NEW YORK.

Letters Patent No. 106,594, dated August 23, 1870.

IMPROVEMENT IN GRAIN-DRILLS.

The Schedule referred to in these Letters Patent and making part of the same.

We, SETH L. KING and WILLIAM OGDEN, of Owego, in the county of Tioga and State of New York, have invented certain Improvements in Grain-Drills, of which the following is a specification.

Our invention relates to the manner of constructing—

First, the distributing-cases, having both sides the same in form, and the mode of attaching them to the bottom of the hopper, by sliding them between strips having beveled edges, thus dovetailing them to the hopper without screws or bolts. The distributing-wheels within the cases having their peripheries concave like a sheave, the grain being delivered directly on the top of the wheels, and is carried in the concaves under the wheels, and discharged through openings in the cases at their rear edge, the stream of grain being partially surrounded by the wheel, secures more positive action in feeding, and this is made still more certain by a row of ribs or points on each side of the concave, close to the outside of the wheel, and facing each other.

Second, the application of a slotted plate, with its thumb-screw and bolt, to each distributing-wheel, the end of the plate to be set up against the rod passing through the wheels, the rod having a flat spot on it for this purpose, by which means the wheels are driven; if a thumb-screw is loosened and the plate moved back, the driving-rod turns freely, and the wheel, so arranged, remains stationary.

Third, the grass-seeder being a hollow cylinder, extending across the machine, and having a narrow vertical slot its entire length for seed to pass down, while within the cylinder a cylindrical brush revolves, and as clover and timothy seeds are mostly used together, the brush keeps them constantly stirred, while feeding with a reciprocating motion causes the clover-seeds, which are largest and lightest, to rise to the top, and the two kinds of seeds, with the reciprocating device, do not feed out evenly together.

Fourth, the arrangement of levers carrying intermediate gears to start and stop the distributing-wheels, also by the same levers to raise and drop the drill-teeth.

Fifth, the stirrers in the plaster-box being narrow strips of metal across the bottom of the hopper, with the ends turned up the sides, thus conforming to the shape of the hopper, these being placed a short distance apart, and riveted to a horizontal bar, to which a reciprocating motion is given, the stirrers reaching across the bottom and part way up the sides of the hopper, the entire contents of the same is certain to be fed out.

Sixth, the manner of conducting both grain and plaster to the openings in the board to which the tubes are attached, which pass seed down to the drill-teeth.

Seventh, the vertical bar, hanging from the pole in the rear of the horses, with a hook at the bottom, and a chain attached, which passes back, and is connected to a cross-bar at the middle of the machine, by attaching the whiffletrees to the hook, and drawing the machine from a point below the center, thus relieving the horses' necks from weight.

In the accompanying drawing—

Figure 1 is a perspective of the machine.

Figure 2 is an elevation, showing the levers and gearing for starting and stopping the distributing-wheels, and for raising and dropping the drill-teeth.

Figure 3 is a vertical transverse section of the grass-seeder, with its hopper.

Figure 4 is a vertical transverse section of the grain and plaster-hoppers, with side of distributing-case, and wheel attached, also section of tube-board below, in its proper position.

Figure 5 is an elevation of pole, vertical bar, chain, and hook, for attaching whiffletrees.

Figure 6 is a vertical section of a distributing-case and wheel, with rear edge of the tube-board in position below it, with its arches and scoops for conducting grain and plaster through the openings in the board.

Figure 7 is a perspective view of the stirrers in the plaster-hopper.

In this machine there is a frame, pole, and wheels, surmounted by a box or hopper, C, for grain, and another, D, for plaster, these not differing essentially from some machines now used.

On the under side of the grain-hopper C is suspended the cases, A A A, in which turn the distributing-wheels, B B B, figs. 1, 4, and 6, the cases being attached to the hopper by dovetails, the edges of the flanges on the cases beveled, fig. 6, and these slide between strips across the bottom of the hopper, having beveled edges, and which holds the distributing apparatus securely to the hopper-bottom without screws or bolts.

The cases are cast in halves, and join in the middle, and are held together by screws, in two ears, on opposite edges, (see fig. 4,) and both sides have circular openings of the same size, and nearly as large as the distributing-wheels, fig. 6.

The wheels have small ledges to keep them in the cases, while the peripheries of the wheels are concave, and are made precisely like a sheave for carrying a rope or chain, except that just inside the concave are two rows of small nibs or points, figs. 4 and 6, which point toward each other from opposite sides, and, with the concave form of the wheels, insure positive action in running out grain.

The grain being held by the cases in the concave faces of the wheels, and being partially surrounded thereby, it is carried round under the wheels, and discharged through openings in the cases at their rear edge.

Attached to the hub of the right-hand wheel, J, is a gear, f, figs. 1 and 2, and on the axle of the same wheel, and close to it, is hung one end of a curved arm, n, fig. 2, which stands upright, and has its upper end secured to a horizontal bar, m, each end of which is attached to an upright lever, k k.

On a stud set in the curved arm n are two gears, a e, which move together. The largest gear, e, which takes motion from the gear f, carries with it the smaller gear a, which in its turn drives the gear c on the end of the rod x, passing through the distributing-wheels B.

Across the machine, close behind the distributers, is hung the roller h, on which wind the chains for raising the drill-teeth. The gear i, on the end of this roller, is close to the gear e, on the curved arm, so that when the levers k are moved back, the gear a is disconnected from the gear c, which stops the feed, and moving the lever still further back, the wheel e comes in mesh with the wheel i, which turns the roller, winds up the chains, and lifts the drill-teeth from the ground. When the teeth are raised high enough, a pin, in the roller, is caught by the pawl r, which keeps the weight of the teeth from turning the roller back. A portion of the circumference of the wheel i, on the roller h, has no teeth, so that when the roller is wound up, and the pin in it is caught by the pawl r, to hold it, the teeth run out of mesh, and nothing can be broken by neglecting to move the levers k k, to throw the gears apart at the proper time.

It will be seen that the driver, seated on the box, by handling the forward lever, k, which is within easy reach, can, by pulling back the lever, stop the feed, and wind up the drill-teeth by power; by moving the lever forward to a middle position, the gears a and e are out of mesh with both the feed and the roller.

When the machine is in position to commence work, the levers are thrown forward, the gears a and e come in mesh, which starts the feed, a pin in the rear lever, or the lower end of the lever, is so constructed as to strike an incline on the pawl r, fig. 2, which lets the roller h turn, dropping the drill-teeth to the ground.

If the attendant is walking behind the machine, he handles the rear lever k by his side with the same result.

At the bottom of the levers, and on the top of the frame timber to which the levers are attached, are two arches, l l, fig. 2, one at the side of each lever. Each arch has three notches in its edge where the lever passes it, and each lever is provided with a latch to drop into the notches in the arches, to hold the levers in the position desired.

The large box at the top is partitioned, fig. 4, the front part, C, being the grain-hopper, and the rear part, D, is the hopper for plaster or fertilizer.

A horizontal bar, s, runs the entire length of the plaster-hopper, to which is riveted, at short distances from each other, short strips of iron, lying across the bottom of the hopper, the ends of the irons being bent upward a short distance to conform to the shape of the hopper. (See figs. 4 and 7.)

By making the irons or stirrers in this form, a bank of plaster cannot remain pressed against one side of the hopper, but is loosened on both sides, and entirely across the bottom, and the contents of the hopper is certain to be all worked out.

The horizontal bar s, fig. 7, receives a reciprocating motion from a wheel, u, fig. 1, having a periphery of irregular form, while a pin on each side of the wheel, and fast to the bar s, causes the bar to be moved backward and forward as the wheel revolves.

The wheel u is turned by a gear, v, attached to it, which, in turn, takes motion from a gear, w, on the hub of the driving-wheel L, fig. 1.

The grass-seeder is placed across the frame of the machine, in front of the distributers, and consists of a hollow cylinder, F, fig. 3, with a narrow slot the whole length of the cylinder from the hopper E on the top of it to the slide at the bottom, for regulating the amount of seed discharged.

The cylinder F has a cylindrical brush, H, rotating within it, which keeps the seed constantly stirred and mixed, motion being given to the brush by means of a band passing round a pulley, o, outside the cylinder, and the hub of the wheel L.

If it is desired to drop the small seeds from this box on top of the ground to be washed in by the rain, suitable hooks are attached to the rear end of side timbers of the frame, the band slipped off the pulley o, the cylinder F, with its hopper E, may be taken out of the hooks in front, and placed in the hooks in the rear, the band replaced on the pulley o, and the grass-seed will be deposited on the ground after the drill-teeth have passed.

In the pole of the machine, just in front of the grass-seeder, is suspended a bar, y, fig. 5, at the bottom of which is hook, with a chain running back to a cross-bar at the middle of the machine. This hook, at the bottom of the bar y, is for attaching the whiffletrees to draw the machine, and, by drawing it from a point below the pole, the forward end of the pole is raised and relieves the horses' necks from unnecessary weight.

The bar y is provided with a number of holes at its upper end, through which a pin passes, to hold it in the pole, and the bar y is raised or lowered as may be desired, to regulate the weight on the horses' necks.

If the machine is wanted to drill two or more rows of corn or beans at a time, at such a distance apart that they may be hoed or furrowed out, any number of the distributers may be run, and the rest remain stationary; or, if in finishing the seeding in a field, a narrow strip of ground remains to be sowed, less in width than the machine, the distributers over the ground already seeded may be also stopped.

The rod x, which drives the distributing-wheels B, has a flat spot on one side where it passes through, and each wheel has a small flat plate, z, figs. 4 and 6, on one side of which is slotted, and through each wheel and plate is a small bolt with a thumb-screw.

The end of the plate z, on each wheel, is pushed up against the flat spot on the rod x, and the wheels are driven thereby.

If a part of the wheels are required to remain stationary, on these the thumb-screw is loosened, the plates slipped back from the rod, which then turns freely in the wheels so arranged.

Under the openings in the rear of the distributing-cases A is the board t, figs. 4 and 6, with a hole through it under each distributer, and surrounding each hole, at the under side of the board, is a tube, to conduct seed into the drill-teeth.

On the top of the board t, and partially surrounding each hole, is a semicircular spout or scoop, d, which rises close up under the opening in the distributer above it, to receive the grain and conduct it through the board.

The spaces between the holes have inclines p p, raised to a point in the center, and sloping down to the holes, fig. 6, and as the plaster-box is directly above the board, fig. 4, in sowing plaster with grain, all plaster falling between the poles is carried to them on the inclines, and thence it passes to the tubes.

What we claim as our invention, and desire to secure by Letters Patent, is—

1. The distributing-cases A A, formed in halves, both sides alike, and joined in the center, combined with the wheels B B, with concave peripheries, and furnished with a row of nibs or points, and the hopper C, attached by dovetails, all constructed as shown and described.

2. In combination with the distributing-wheels B, the plate $z$, with its bolt and thumb-screw, for fastening or releasing the wheels from the rod $x$, as described.

3. The arrangement of the gear-wheels $f\ e\ a\ c$, and the partially-toothed wheel $i$, on the roller $h$, in combination with the levers $k\ k$, with their latches, arches $l\ l$, and pawl $r$, the whole arranged substantially in the manner and for the purpose herein set forth.

4. The grass-seeder consists of a square trunk, running across the machine, with a cylindrical bore, F, fig. 3, with a narrow slot the whole length of the bore, from the hopper E on the top of the trunk to the slide at the bottom, for regulating the amount of seed to be discharged.

5. The peculiar shape of the iron stirrers, conforming to the shape of the plaster-hopper D, when attached to the bar $s$, and operating in the manner herein described.

6. The zigzag-rimmed wheel $u$, gears $v$ and $w$, in combination with the plaster-sower, when these several parts are arranged in the manner and for the purpose herein set forth.

7. The inclines $p\ p$, and spouts $d\ d$, on the tube-board $t$, as described.

SETH L. KING.
WILLIAM OGDEN.

Witnesses:
HARRY JEWETT,
WILLIAM C. SOLOMON.